(12) United States Patent
Glynn et al.

(10) Patent No.: US 7,791,471 B2
(45) Date of Patent: Sep. 7, 2010

(54) ITEM LOCATOR SYSTEM UTILIZING ITEM AND LOCATION BAR CODES

(76) Inventors: Kenneth P. Glynn, 29 Plennert Rd., Flemington, NJ (US) 08822; Jerome R. Mahoney, 3 Berkeley Pl., Colts Neck, NJ (US) 07722

( * ) Notice: Subject to any disclaimer, the term of this patent is extended or adjusted under 35 U.S.C. 154(b) by 302 days.

(21) Appl. No.: 11/862,394

(22) Filed: Sep. 27, 2007

(65) Prior Publication Data
US 2008/0048830 A1 Feb. 28, 2008

Related U.S. Application Data

(63) Continuation of application No. 10/696,660, filed on Oct. 29, 2003, now Pat. No. 7,292,678, which is a continuation-in-part of application No. 09/653,658, filed on Aug. 31, 2000, now Pat. No. 6,813,341.

(51) Int. Cl.
*G08B 1/08* (2006.01)
(52) U.S. Cl. .............. 340/539.13; 340/539.1; 340/539.11; 340/539.32; 340/825.36; 340/825.49
(58) Field of Classification Search ............. 340/539.1, 340/539.11, 539.13, 539.23, 539.32, 825.36, 340/825.49; 379/88.04, 88.01; 704/246
See application file for complete search history.

(56) References Cited

U.S. PATENT DOCUMENTS

| | | | |
|---|---|---|---|
| 4,783,803 A | 11/1988 | Baker | |
| 5,111,501 A | 5/1992 | Shimanuke | |
| 5,136,634 A | 8/1992 | Rae | |
| 5,165,095 A | 11/1992 | Borcherding | |
| 5,168,548 A | 12/1992 | Kaufman | |
| 5,222,121 A | 6/1993 | Shimada | |
| 5,231,670 A | 7/1993 | Goldhor | |
| 5,239,586 A | 8/1993 | Marui | |

(Continued)

FOREIGN PATENT DOCUMENTS

EP 1003119 A2 5/2000

(Continued)

OTHER PUBLICATIONS

Office action mailed Aug. 8, 2007, for U.S. Appl. No. 11/592,316.

(Continued)

*Primary Examiner*—Daryl Pope
(74) *Attorney, Agent, or Firm*—Schwabe, Williamson & Wyatt, P.C.

(57) ABSTRACT

An item location system uses voice activation and responsiveness to identify location(s) of item(s) sought by a user. The system may include a continuous speech recognition digital signal processor, a programmable microprocessor interfaced therewith, voice input and user feedback mechanisms, including audio and/or video feedback. Some embodiments utilize audio feedback to the user. The system also includes sufficient software and equipment to create item-identification/corresponding location-identification data pairs by utilizing item identifying bar codes on the items and matching them to location identifying bar codes physically situated on the corresponding locations. The continuous speech recognition engine may utilize Hidden Markov Models to create real time continuous speech recognition and feedback.

16 Claims, 4 Drawing Sheets

U.S. PATENT DOCUMENTS

| | | | |
|---|---|---|---|
| 5,301,227 | A | 4/1994 | Kamei |
| 5,335,276 | A | 8/1994 | Thompson |
| 5,349,636 | A | 9/1994 | Irribarren |
| 5,390,278 | A | 2/1995 | Gupta |
| 5,406,618 | A | 4/1995 | Knuth |
| 5,426,284 | A | 6/1995 | Doyle |
| 5,602,963 | A | 2/1997 | Bissonnette |
| 5,621,658 | A | 4/1997 | Jackson |
| 5,631,745 | A | 5/1997 | Wong |
| 5,671,328 | A | 9/1997 | Fitzpatrick |
| 5,786,764 | A | 7/1998 | Engellenner |
| 5,832,063 | A | 11/1998 | Vysotsky et al. |
| 5,850,627 | A | 12/1998 | Gould |
| 5,884,221 | A | 3/1999 | Wortham |
| 5,899,973 | A | 5/1999 | Bandara |
| 5,930,336 | A | 7/1999 | Junqua et al. |
| 5,991,712 | A | 11/1999 | Martin |
| 6,092,045 | A | 7/2000 | Stubley |
| 6,123,259 | A | 9/2000 | Ogasawara |
| 6,148,291 | A | 11/2000 | Radian |
| 6,157,705 | A | 12/2000 | Perrone |
| 6,236,715 | B1 | 5/2001 | Wong |
| 6,260,012 | B1 | 7/2001 | Park |
| 6,394,278 | B1 | 5/2002 | Reed |
| 6,408,307 | B1 | 6/2002 | Semple |
| 6,442,530 | B1 | 8/2002 | Miller |
| 6,462,616 | B1 | 10/2002 | Beswick et al. |
| 6,497,367 | B2 * | 12/2002 | Conzola et al. ........ 235/462.45 |
| 6,507,352 | B1 | 1/2003 | Cohen |
| 6,529,940 | B1 | 3/2003 | Humble |
| 6,547,141 | B1 | 4/2003 | Lepore et al. |
| 6,598,025 | B1 | 7/2003 | Hamilton et al. |
| 6,604,681 | B1 | 8/2003 | Burke |
| 6,813,341 | B1 | 11/2004 | Mahoney |
| 6,870,464 | B2 | 3/2005 | Okamura |
| 7,136,465 | B2 | 12/2006 | Glynn |
| 7,146,243 | B2 | 12/2006 | Glynn |
| 7,231,380 | B1 | 6/2007 | Pienkos |
| 7,292,678 | B2 * | 11/2007 | Glynn et al. ............ 379/88.04 |
| 7,495,551 | B2 * | 2/2009 | Waxman ................ 340/539.1 |
| 7,525,568 | B2 * | 4/2009 | Raghunath ................... 348/61 |
| 7,532,878 | B2 * | 5/2009 | Hagebarth ............... 455/414.1 |
| 7,592,909 | B2 * | 9/2009 | Zaruba et al. .......... 340/539.13 |
| 2002/0149609 | A1 | 10/2002 | Suzuki |
| 2002/0158133 | A1 * | 10/2002 | Conzola et al. ........ 235/462.45 |
| 2004/0181461 | A1 * | 9/2004 | Raiyani et al. ................. 705/26 |
| 2004/0181467 | A1 * | 9/2004 | Raiyani et al. ................. 705/28 |
| 2005/0092833 | A1 | 5/2005 | Glynn |
| 2005/0140498 | A1 * | 6/2005 | Bastian, II ................. 340/5.92 |
| 2008/0301102 | A1 * | 12/2008 | Liang ........................... 707/3 |

FOREIGN PATENT DOCUMENTS

JP          356060959        5/1981

OTHER PUBLICATIONS

Notice of Allowance mailed Aug. 27, 2009, for U.S. Appl. No. 11/592,316.
Office action mailed Feb. 24, 2005, for U.S. Appl. No. 10/696,660.
Office action mailed Jul. 27, 2005, for U.S. Appl. No. 10/696,660.
Notice of Allowance mailed Dec. 28, 2006, for U.S. Appl. No. 10/696,660.
Notice of Allowance mailed Jun. 26, 2007, for U.S. Appl. No. 10/696,660.
Office action mailed Jul. 3, 2002, for U.S. Appl. No. 09/653,658.
Final Office action mailed Feb. 14, 2003, for U.S. Appl. No. 09/653,658.
Office action mailed Jul. 9, 2003, for U.S. Appl. No. 09/653,658.
Final Office action mailed Jan. 2, 2004, for U.S. Appl. No. 09/653,658.
Notice of Allowance mailed Jul. 14, 2004, for U.S. Appl. No. 09/653,658.
Office action mailed Feb. 24, 2005, for U.S Appl. No. 10/699,090.
Final Office action mailed Jul. 27, 2005, for U.S. Appl. No. 10/699,090.
Notice of Allowance mailed Aug. 3, 2006, for U.S. Appl. No. 10/699,090.
Pending U.S. non-provisional application entitled "Voice activated/voice responsive item locator," filed Nov. 2, 2006 as U.S. Appl. No. 11/592,316 (reissue of U.S. 6,813,341).

* cited by examiner

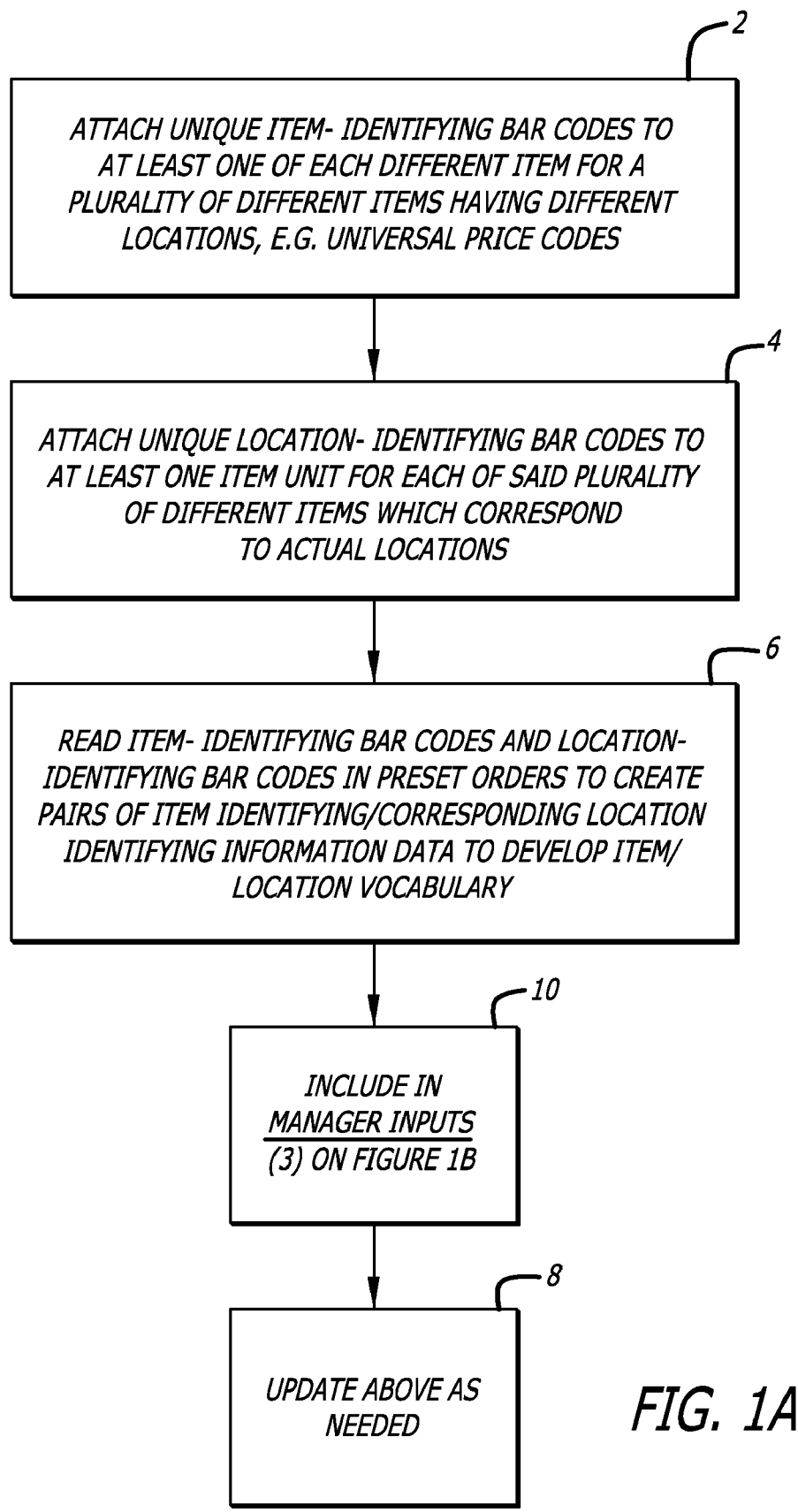

ITEM LOCATOR SYSTEM UTILIZING ITEM AND LOCATION BAR CODES

RELATED APPLICATIONS

This application is a continuation of U.S. application Ser. No. 10/696,660 filed Oct. 29, 2003, now U.S. Pat. No. 7,292,678 which is a continuation-in-part of U.S. application Ser. No. 09/653,658 filed Aug. 31, 2000, now U.S. Pat. No. 6,813,341, each of the foregoing applications being hereby fully incorporated by reference herein.

FIELD

This disclosure relates to voice activated/voice responsive item locators, i.e. item directories, which direct a user such as a consumer or shopper, to a specific location to view, retrieve, order, purchase or otherwise use the information obtained in the system.

BACKGROUND

Information Disclosure Statement

The state of the art for acquiring product location information involves the use of manually collected, inputted data. Bar codes have been used for years to identify products, but not to identify locations.

The following patents relate to machines involving speech recognition for voice-based operation and thus illustrate known voice recognition applications:

U.S. Pat. No. 5,111,501 to Masanobu Shimanuki describes a telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database storage location to a requestor'S facsimile machine over a telephone line which includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

U.S. Pat. No. 5,165,095 to Mark A. Borcherding describes a method for dialing a telephone, using voice recognition to initiate the dialing and to determine the correct telephone number. The dialing is initiated with a spoken dial command that is recognized by using speaker independent templates that are stored locally with respect to the caller'S telephone. The correct telephone number is recognized by using speaker dependent template that are downloaded from a central database or by using speaker independent templates stored locally.

U.S. Pat. No. 5,168,548 to Steven Kaufman et al. describes a reporting system which is disclosed herein, a speech recognizer which is used to select selections of text from a report telephone mounted on a vehicle or similar mobile body and which allows a call to be originated with ease. When the user of the telephone enters a voice command on voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

U.S. Pat. No. 5,231,670 to Richard S. Goldhor et al. describes a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

U.S. Pat. No. 5,239,586 to Kuniyoshi Marui describes a voice recognition system which comprises a handset and a hands-free microphone for generating an input audio signal, a high-pass filter for eliminating low frequency components from the signal from the handset or hands-free microphone, a signal lever controller for adjusting the level of the high-pass signal in response to the user of either the handset or hands-free microphone, a storer for storing the speech data and a controller for controlling the storer so that a user'S utterance is stored or the user'S utterance is recognized by comparing the utterance to speech data already stored. The handset hook switch provides an on-hook control signal to reduce amplifier gain during hands-free microphone operation.

U.S. Pat. No. 5,301,227 to Shoichi Kamei et al. describes an automatic dial telephone that is useable in a motor vehicle, when a voice input is provided during a period in which input of the names of called parties is awaited, a voice pattern of the name of the called party is compared with reference patterns of called parties stored in reference patterns storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

U.S. Pat. No. 5,335,276 to E. Earle Thompson et al. describes a communication system which is provided with multiple purpose personal communication devices. Each communication device includes a touch-sensitive visual display to communicate text and graphic information to and from the user and for operating the communication device. Voice activation and voice control capabilities are included within communication devices to perform the same functions as the touch-sensitive visual display. The communication device includes a built-in modem, audio input and output, telephone jacks and wireless communication. A plurality of application modules are used with personal communication devices to perform a wide variety of communication functions such as information retrievable, on-line data base services, electronic and voice mail. Communication devices and application modules cooperate to allow integrating multiple functions such as real time communication, information storage and processing, specialized information services, and remote control of other equipment into an intuitively user friendly apparatus. The system includes both desktop and hand-held communication devices with the same full range of communication capabilities provided in each type of communication device.

U.S. Pat. No. 5,349,636 to Roberto Irribarren describes a communication system for verbal telephonic communication which has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

U.S. Pat. No. 5,406,618 to Stephen B. Knuth et al. describes a telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

U.S. Pat. No. 5,602,963 to W. Michael Bissonnette et al. describes a small, portable, hand-held electronic personal organizer which performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of different functions, including voice training, memo record, reminder, manual reminder, timer setting, message review, waiting message, calendar, phone group select, number retrieval, add phone number, security and "no" logic. During such-various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data.

U.S. Pat. No. 5,621,658 to Brion K. Jackson describes an action contained within an electronic mail object which is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

U.S. Pat. No. 5,631,745 to John J. Wong et al. describes a telephone terminal adapted for business or home use that includes the ability to receive and send facsimiles, a voice answering function and a computer modem. Various input and output devices may be used for the facsimile function. A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

U.S. Pat. No. 5,671,328 to Gregory P. Fitzpatrick et al. describes a method and data processing system which are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

U.S. Pat. No. 5,850,627 to Joel M. Gould et al. describes a word recognition system which can: respond to the input of a character string from a user by limiting the words it will recognize to words having a related, but not necessarily the same, string; score signals generated after a user has been prompted to generate a given word against words other than the prompted word to determine if the signal should be used to train the prompted word; vary the number of signals a user is prompted to generate to train a given word as a function of how well the training signals score against each other or prior models for the prompted word; create a new acoustic model of a phrase by concatenating prior acoustic models of the words in the phrase; obtain information from another program running on the same computer, such as its commands or the context of text being entered into it, and use that information to vary which words it can recognize; determine which program unit, such as an application program or dialog box, currently has input focus on its computer and create a vocabulary state associated with that program unit into which vocabulary words which will be made active when that program group has the focus can be put; detect the available computational resources and alter the instructions it executes in response; test if its ability to respond to voice input has been shut off without user confirmation, and, if so, turn that ability back on and prompt the user to confirm if that ability is to be turned off; store both a first and a second set of models for individual vocabulary words and enable a user to selectively cause the recognizer to disregard the second set of models for a selected word; and/or score a signal representing a given word against models for that word from different word model sets to select which model should be used for future recognition.

BRIEF DESCRIPTION OF THE DRAWINGS

The present disclosure should be more fully understood when the specification herein is taken in conjunction with the drawings appended hereto wherein:

FIGS. 1a and 1b show a general schematic diagram showing software and functional features of an item locator system, including the method of creating item/location data pairs;

DETAILED DESCRIPTION

Figure 1B:
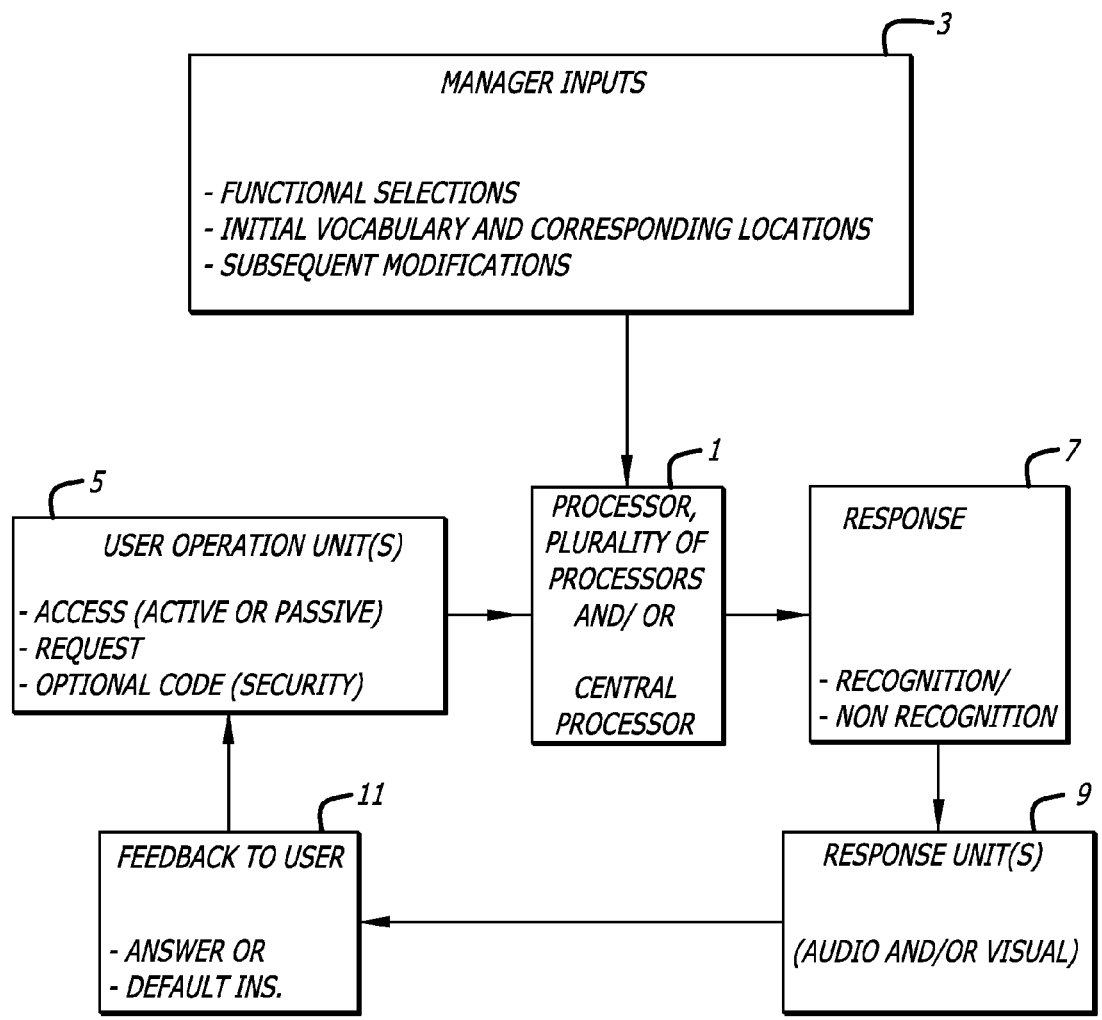

As mentioned above, this disclosure relates to voice activated/voice responsive item locators, i.e. item directories, which direct a user such as a consumer or shopper, to a specific location to view, retrieve, order, purchase or otherwise use the information obtained in the system. Further, the disclosure includes within the aforesaid system, a method of collecting location data for the system which involves the use of product bar codes and location-situated, location-identifying bar codes. These are read and matched and stored in the main processor of the system to provide location information to subsequent users. Typically, the disclosure could be used at retail stores to locate items to be purchased. Alternatively, it could be used at a production facility or distribution facility having a large number of parts, to locate specific parts for as needed. In other embodiments, it could be used in non-commercial entities, such as public libraries to locate a particular book. The locator of the disclosure relies upon a specific software module to accomplish voice recognition and response, and includes manager programming for customization, updates and modifications.

A voice activated/voice responsive item locator system is disclosed to enable a user to speak into the system and have the system respond with location information for an item requested by the user. For example, shopper at a home supply store may pick up a locator phone or just speak into a wall mounted or otherwise situated microphone and say "Locate Outdoor Paint" or "Find Hammers" or simply state what is sought without the use of a verb, e.g. "Caulking". The system may reply either with voice or visual (words on a screen, or map), or both voice and visual, e.g. "Aisle 3, Shelf 4". In some instances the system will reply, for example, with a "Repeat", or "Restate in different words" or "Please talk to information desk" or other default instructions.

The disclosure also includes a method of creating data for locating items so that the system is efficiently loaded with location data both prior to use by the customers or other users, as well as so that the system may be updated as desired while it is in use. This method involves utilization of bar codes to determine item identity, and the use of separate bar codes to determine locations. These separate bar codes are physically located on location structure, e.g. on aisle ends, shelf edges, bin walls, parking spaces, etc. This location data is read in conjunction with item identification data by bar code readers, fed to a processor in a recognizable combined format, and then stored and used as the resource data of the locator system.

For example, a supermarket could assign unique bar codes to each aisle, create bar code labels and attach them to the ends of each aisle, and then program the system according to the following simple process:

a) The processor will be programmed to read and identify products by the universal price code ("UPC") inputs from a bar code reader, and will likewise be programmed to recognize and identify locations by bar code inputs from a bar code reader, that is, the processor will be programmed to understand the codes created for particular locations to be included in the supermarket product location system;

b) The processor will also be programmed to match items (products) to locations when read between identical location readings. In other words, when a reader inputs a location bar code from one end of an aisle, and then reads all of the UPCs of all items in the aisle, and then reads the same location bar code at the other end of the same aisle, this tells the processor to create a matching set of pairs of products and locations for all products read between each end of that aisle. In an alternative embodiment, each type of item could be read before or after the location reading to create location data pairings.

The overall locator system may be a stand-alone device, but in most embodiments would be part of an internal connected system. It could be an intranet or secured internet system, but would in many cases be a storewide system with a plurality of user locations (units, phones, or microphones, with feedback at each location). The system will include an embedded voice-driven interface for speech control of: (1) operational instructions; (2) core system locator function operations, that is, recognition of specific requests and responses thereto; and, (3) optional and default functions. In preferred embodiments, the device of the present disclosure is both operated by speech (speech or voice activated) and speech responsive (voice answers and instructions to the user from the system). Thus, the device relies upon automatic speech recognition (ASR), either in place of or in addition to manual locator systems, e.g. book, list, map and computer directories. In some embodiments, user feedback features are included wherein both audio and visual feedback is given to a user in response to recognizable voice signals, while in other possible embodiments, the user may designate audio or visual.

The present disclosure provides a voice activated/voice responsive item locator and system. By "item" is meant a place or thing that a user desires to locate. Thus, an item could be a particular brand of canned string beans, a type of outdoor stain, a booth at a convention, a particular part in inventory for sale, assemblage or distribution, a particular automobile in a production facility lot or in a large parking garage, or a room, a functional group or a person in an office building or the like. The response may be in the form of a word or sentence presented visually or audibly and it may designate an aisle, a shelf, a bin number, a room number, a row and slot or space, etc.

The voice recognition system digitizes words spoken via a receiver (microphone) handset, headset, or built-in microphone for conversion from analog to digital utilizing a continuous speech recognition digital signal processor (DSP). The main support structure may be a conventional type housing for phones and other communications devices, may be of a different shape or configuration or may be built into a device such as a wall or desk unit, with or without monitor. It may be portable or permanently affixed and could be powered by any means available, e.g. AC or DC current. In the portable mode, the system would be wireless for the user and would, in that respect operate like a cell phone, two way radio, "walkie talkie" or other short distance wireless device, but would have a processor at a central or fixed location having the same features as described above, i.e., the DSP with programming capabilities, etc.

The DSP is connected to a programmable microprocessor and either by customized input or a standard program, the system enables the user to quickly enter voice-activated fields, e.g., such as "Where is . . . ", "Find . . . ", etc. Verification of voice recognition accuracy (prior to execution) is optional and may be accomplished via synthesized voice playback and/or a screen confirmation which requires a "YES" or "NO" to execute or open for revision. In some preferred embodiments, a screen, e.g., LCD, enables visual feedback during input phase, with support for deletion, insertion, correction, etc. Cancellation of the entire command or programming instructions may be possible at any time (prior to execution), via keystroke or voice command.

Another important aspect is the inclusion into the system of software and hardware (equipment) to utilize a method of creating item location information for the system. It involves using item-identifying bar codes on items to be included and using location-identifying bar codes from corresponding locations. The location-identifying bar codes are physically situated on the locations themselves. For example, they are located on aisle ends, shelves, bins, drawers, floor area grids, etc.

The location-identifying bar codes may be custom created for the locations or may be established as a universal location system. Alternatively, a manager could use existing UPC bar codes for the locations, provided that they were different from the items to be located, and provided that the system were programmed to correlate these particular codes to specified locations.

The item-identifying bar codes are typically located on the items themselves, but when more than one identical item is included, a single item of the set of identical items will be sufficient for the method to work. However, it is preferred that all items in each set have the bar code located thereon. In some preferred embodiments, the bar codes for the items are Universal Price Code (UPC) bar codes, but the present disclosure need not be limited thereto, such as when it would be more appropriate to create unique identifying codes for each and every item, such as automobiles, artwork, etc.

The essential features of the present disclosure involve the creation of a voice-based guide or locator and the creation of appropriate item/corresponding location data base, to offer enhanced convenience and speed to users for location of one or more items.

FIGS. 1a and 1b show a general schematic diagram of a system showing general software features and functional features. Thus, the system includes a method, software and hardware for the creation of item/location data pairs, as described above. In FIG. 1a, the basic aspects of the item/location information data creation are set forth in schematic form. The unique item-identifying bar codes are attached 2 to at least one of each different item for a plurality of sets of items, each set having items different from the items in the other sets. Likewise, unique location-identifying bar codes are attached 4 to the corresponding locations, and, subsequently, they are read 6 in predetermined manner so that the program recognizes sequences and creates data pairs to develop the item/location vocabulary for the system. This information is included in manager inputs 10 (reference also FIG. 1b). The method shown in FIG. 1a is repeated as needed for updating 8.

FIG. 1b illustrates other features of the present disclosure and includes a central processor 1 which may be an external or internal component, i.e., within a single unit or at a separate location from audio receivers and transmitters, e.g., microphones/speakers for user inputs and feedback to users.

The system may be preprogrammed with the user being required to follow concise instructions for activation and operation, or may be programmable to alter, add or enhance ease or methods of use, e.g. through a limited access code, for manager inputs 3 of user instructions. In any event, manager inputs 3 shall include functional selections and inputs of items and their locations, with provision for subsequent access for modifications. This programming may include direct keyboard, voice, etc., and, as mentioned, may include security capabilities for preventing unauthorized use, e.g. voice identification (user recognition) or user security code system, as well as other options which may be included therein, such as a "help" detailed manager instruction section.

Once the system has been programmed for use, the user operation unit(s) 5 provide functional access, which may be passive, i.e., the user speaks, picks up a phone, presses a button, or otherwise takes some action to activate the system; or it may be active, i.e., a proximity sensor, a periodicity timer, or other internal mechanism may automatically activate the system and could trigger an audio or visual query, such as "May I help you locate a product?"

Once the system has been activated and a user has stated the necessary words of input to activate the device, recognition/non-recognition response 7 results from processing the user inputs to central processor 1, and audio and/or video response unit(s) 9 provide feedback 11 to the user, either by answering the inquiry, conditionally defaulting, e.g., asking for a repeat or a restate the question, or fully defaulting, e.g. directing the user to a courtesy desk or check out counter for help.

Figure 2:
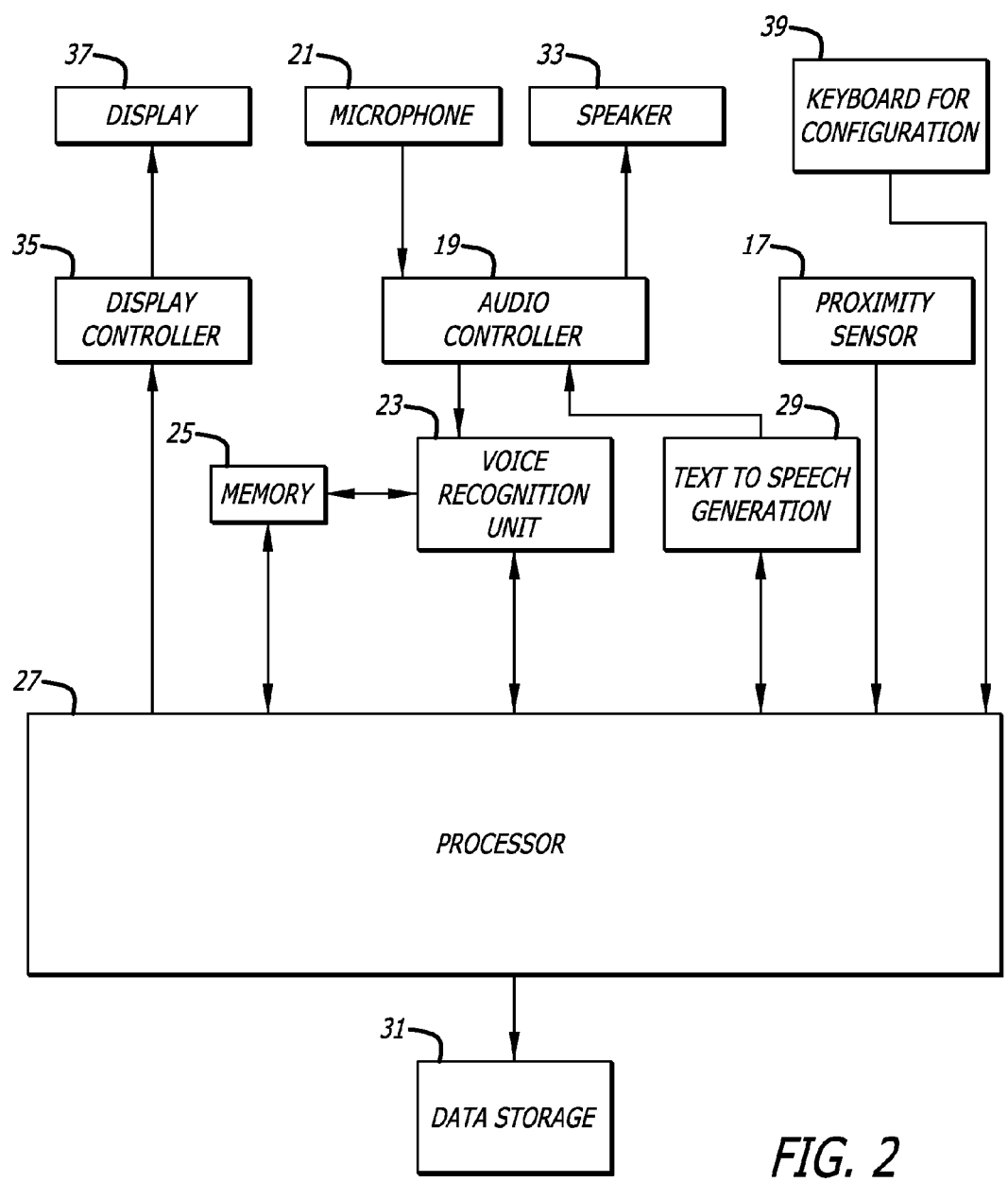
FIG. 2 shows a schematic diagram illustrating the physical functions of a voice recognition item locator device after the item/location information data pairs have been created.

FIG. 2 shows a schematic diagram illustrating a voice activated/voice responsive item locator system, showing the physical arrangement and function of components after the item/corresponding location information has been inputted. Thus, symbol 17 indicates an optional user prompter proximity sensor and symbol 21 is a microphone or equivalent component for voice input. The voice input is sent to audio controller 19 and to automatic speech recognition unit 23 and is converted from analog to digital signals. CPU/Memory 25 compares the digital signals to the set up or dictionary of digital words or phrases in memory. Once a match is found, the system processor 27 and data storage 31 operate to respond with an answer or a default instruction or a query by providing digital text to text-to-speech generator 29, which provides audio feedback to a user via audio controller 19 and speaker 33. Feedback to a user may also be provided on visual screen 37 via display controller 35. Keyboard 39 is used for manager set up and modifications.

Figure 3:
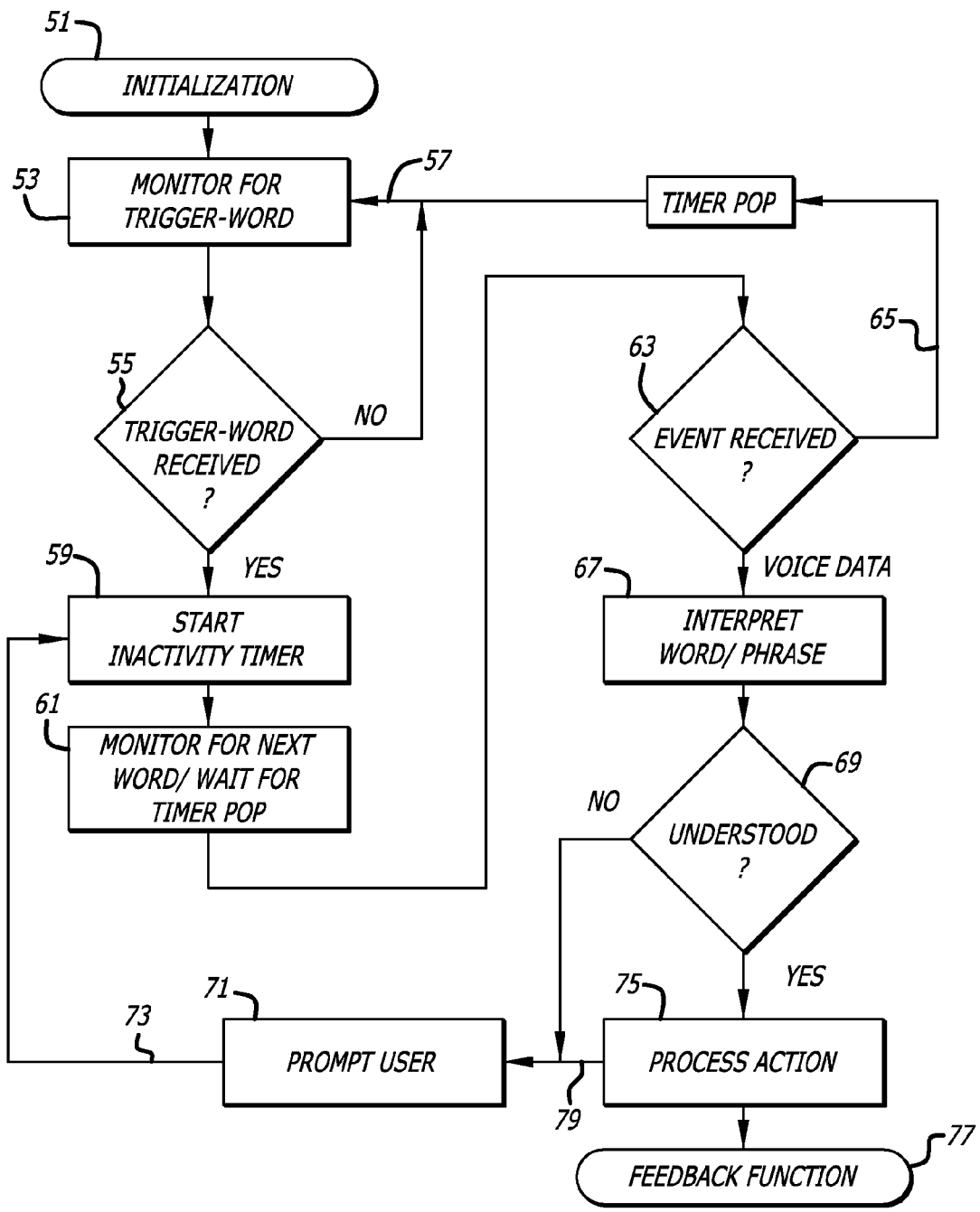
FIG. 3 shows a schematic diagram of a device illustrating details of a voice recognition submodule used therein.

FIG. 3 shows the details of one preferred embodiment of the submodule used in the device of the present disclosure. The voice recognition component converts an acoustic signal into a sequence of labels. The system takes the raw acoustic data, and processes it through the recognizer. The recognizer then matches it against a set of models using a decoder that generates a recognition token. This token represents what the user said as either a single word or utterance. The recognizer itself does not interpret the meaning of the recognized output, that is the function of the interpreter (described later). The recognizer uses Hidden Markov Models (HMMs) to provide for a continuous speech recognition engine. HMMs do not process the acoustic signal directly but instead split the signal into a sequence of discrete observations. These observations are derived from a digital representation of the signal that had been converted from the analog signal generated by the microphone. During recognition, the likelihood of each model (or sequence of models) matching the incoming signal is calculated. The recognizer simply selects the most likely model to decode the signal. As this is done continuously, the recognizer can process speech as opposed to isolated words, allowing the user to talk more naturally.

Each acoustic model represents a short sound. The interpreter combines these sounds into words using a dictionary. This dictionary specifies the pronunciation of each word in terms of the acoustic models. After identifying the most likely word, the interpreter then joins sets of models together (using a Viterbi decoder) in a series of pre-defined connections such that paths can be established to provide for a degree of "natural language" recognition; in other words, the user can say "Find hammers", "Where are hammers" or "hammers" and they are all understood to mean the same thing. Moreover, these sets of models and dictionaries are interchangeable, allowing the same voice recognition component to be used in a variety of applications.

As the voice recognition component is running continuously, there needs to be a way to distinguish background conversations that might accidentally trigger an unwanted action by the device. For example, two people standing by a voice-activated device might be discussing locations of different goods in a supermarket and be misinterpreted or undesirably responded to. To avoid this problem, the recognition unit requires a command word to trigger before beginning further recognition. The trigger word is a user-definable setting.

Thus, in FIG. 3, initialization 51 initiates monitoring 53 for a trigger word from a user. When a word is received, it is analyzed to determine whether or not a trigger word 55 has been received. If not, signal 57 returns the status to monitoring 53 for a new word. This loop continues until a trigger word is recognized and an inactivity timer 59 is started. The monitor 61 proceeds with the monitoring for the next word and waits for timer pop 65. When an event 63 is received, timer pop 65 returns to the monitor 53 to continue the monitoring process and the voice data is sent to interpretation 67. If it is understood 69, an action 75 if process and feedback function 77 is performed. Additionally, signal 79 prompts user 71. Likewise, if the interpretation is not understood 69, user 71 is prompted and via signal 73, timer 59 begins again. These cyclings operate on a continual basis while the system is initiated. Voice activation may also be used to shut down the system.

Numerous modifications and variations of the present disclosure are possible in light of the above teachings. It is therefore understood that the present disclosure may be practiced otherwise than as specifically described herein.

What is claimed is:

1. A method comprising:
converting, by a voice recognition system, an acoustic signal, representing a request for location information associated with an item having an association with an aisle and a shelf, into a digital signal;
monitoring, by the voice recognition system, for a user-definable setting, wherein the user-definable setting comprises a trigger word transmitted to the voice recognition system;
determining, by the voice recognition system, one or more words included in the acoustic signal based at least in part on the digital signal and said monitoring; and
providing, by the voice recognition system, feedback to the request for location information based at least in part on the determined one or more words, wherein the feedback includes an aisle identifier that identifies the aisle and a shelf identifier that identifies the shelf.

2. The method of claim 1, wherein determining the one or more words included in the acoustic signal comprises:
processing, by the voice recognition system, the digital signal into one or more observations;
selecting, by the voice recognition system, one or more models for the one or more observations, wherein the one or more models represent one or more sounds that when combined form a pronunciation of the digital signal; and
identifying, by the voice recognition system, the one or more words from a database that includes words and corresponding models by comparing the selected one or more models with the corresponding models.

3. The method of claim 1, wherein said providing feedback to the request for location information comprises providing visual feedback to the request for location information.

4. The method of claim 1, wherein said providing feedback to the request for location information comprises providing auditory feedback to the request for location information.

5. The method of claim 1, further comprising:
providing, by the voice recognition system, one or more default instructions in response to a determination that the acoustic signal does not represent a request for location information.

6. The method of claim 1, further comprising:
receiving, by the voice recognition system, the acoustic signal representing the request for the location information via a receiver.

7. A voice recognition system, comprising:
an audio controller configured to convert an acoustic signal into a digital signal, wherein the acoustic signal represents a request for location information associated with an item having an association with an aisle and a shelf; and a voice recognition unit coupled to the audio controller and configured to:
monitor for a trigger word transmitted to the voice recognition system and, in response to receipt of the trigger word, determine one or more words included in the acoustic signal based on the digital signal; and
provide feedback, via an input/output device, to the request for location information, wherein the feedback is provided based at least in part on the determined one or more words, and wherein the feedback includes an aisle identifier that identifies the aisle and a shelf identifier that identifies the shelf.

8. The voice recognition system of claim 7, wherein the voice recognition unit is further configured to process the digital signal into one or more observations, select one or more models to represent the one or more observations, wherein the one or more models are associated with one or more sounds that when combined form a pronunciation of the digital signal, and identify the one or more words from a database by comparing the selected one or more models with corresponding models in the database.

9. The voice recognition system of claim 7, further comprising:
a text to speech generator coupled to the voice recognition unit and the input/output device, and configured to enable feedback to be provided via the input/output device as an audio response to the request to locate the item.

10. The voice recognition system of claim 8, further comprising:
a storage unit coupled to the voice recognition unit and configured to store the database.

11. The voice recognition system of claim 7, wherein the input/output device is configured to receive the request for the location information and includes a visual display.

12. An apparatus, comprising:
means for converting an acoustic signal into a digital signal, wherein the acoustic signal represents a request for location information associated with an item having an association with an aisle and a shelf;
means for monitoring for a trigger word transmitted to the apparatus, and in response to receipt of the trigger word, determining one or more words included in the acoustic signal based on the digital signal; and
means for providing feedback to the request for location information based at least in part on the determined one or more words, wherein the feedback includes an aisle identifier that identifies the aisle and a shelf identifier that identifies the shelf.

13. The apparatus of claim 12, wherein the means for determining the one or more words included in the acoustic signal further comprises:
means for processing the digital signal into one or more observations;
means for selecting one or more models for the one or more observations, wherein the one or more models represent one or more sounds that when combined form a pronunciation of the digital signal; and
means for identifying the one or more words from a database that includes words and corresponding models by comparing the selected one or more models with the corresponding models.

14. The apparatus of claim 12, further comprising:
means for receiving the acoustic signal.

15. An article of manufacture including a tangible digital storage medium having instructions stored thereon that, if executed by a voice recognition system, cause the voice recognition system, to perform operations including:
converting an acoustic signal into a digital signal, wherein the acoustic signal represents a request for location information associated with an item having an association with an aisle and a shelf;
monitoring for a user-definable setting, wherein the user-definable setting comprises a trigger word transmitted to the voice recognition system;
determining one or more words included in the acoustic signal based at least in part on the digital signal and said monitoring; and
providing feedback to the request for location information based at least in part on the determined one or more words, wherein the feedback includes an aisle identifier that identifies the aisle and a shelf identifier that identifies the shelf.

16. The article of manufacture of claim 15, wherein said determining one or more words:
processing the digital signal into one or more observations;
selecting one or more models for the one or more observations, wherein the one or more models represent one or more sounds that when combined form a pronunciation of the digital signal; and
identifying the one or more words from a database that includes words and corresponding models by comparing the selected one or more models with the corresponding models.

* * * * *